S008993141B2

United States Patent
Kim et al.

(10) Patent No.: US 8,993,141 B2
(45) Date of Patent: Mar. 31, 2015

(54) CAP ASSEMBLY AND SECONDARY BATTERY USING THE SAME

(71) Applicant: LG Chem, Ltd., Seoul (KR)

(72) Inventors: Sung-Jong Kim, Daejeon (KR); Cha-Hun Ku, Daejeon (KR); Je-Jun Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 179 days.

(21) Appl. No.: 13/859,071

(22) Filed: Apr. 9, 2013

(65) Prior Publication Data

US 2013/0216870 A1    Aug. 22, 2013

Related U.S. Application Data

(63) Continuation of application No. PCT/KR2011/009408, filed on Dec. 7, 2011.

(30) Foreign Application Priority Data

Dec. 7, 2010   (KR) ........................ 10-2010-0124364

(51) Int. Cl.
*H01M 2/00* (2006.01)
*H01M 2/08* (2006.01)
(Continued)

(52) U.S. Cl.
CPC ............ *H01M 2/08* (2013.01); *H01M 10/0422* (2013.01); *H01M 2/12* (2013.01); *H01M 2/34* (2013.01); *H01M 2/0413* (2013.01); *H01M2/348* (2013.01); *H01M 2/0426* (2013.01); *H01M 2/1241* (2013.01); *H01M 2200/106* (2013.01)
USPC ....................................................... 429/61

(58) Field of Classification Search
CPC .......... H01M 2/08; H01M 2/34; H01M 2/12; H01M 2/348; H01M 2/0413; H01M 2/0426; H01M 2/1241; H01M 10/0422; H01M 2200/106

See application file for complete search history.

(56) References Cited

U.S. PATENT DOCUMENTS 7,618,745 B2   11/2009   Yamashita et al.
2009/0148766 A1   6/2009   Shen et al.
(Continued)

FOREIGN PATENT DOCUMENTS

JP    11-191404 A    7/1999
KR    10-0399783 B1    9/2003
(Continued)

OTHER PUBLICATIONS

International Search Report issued in PCT/KR2011/009408, mailed on Jul. 11, 2012.

*Primary Examiner* — Raymond Alejandro
(74) *Attorney, Agent, or Firm* — Birch, Stewart, Kolasch & Birch, LLP

(57) ABSTRACT

Cap assembly, coupled to an open end of a battery can free from a beading portion, includes a top cap at an uppermost portion in a protrusive form forming a cathode terminal, a safety element below the top cap contacting the top cap, a safety vent contacting the safety element, a gasket surrounding outer circumferences of top cap, the safety element and vent, a cover surrounding the gasket so the top cap, safety element and vent adhere to each other, and a welding member at an upper portion of the cover having an outer end protruding more outwards than the outer end of the cover placed on the open end of the battery can, the welding member having a first notch at an upper surface thereof, protruding more than the outer end of the cover, and welded to the open end of the battery can where first notch is formed.

18 Claims, 6 Drawing Sheets

(51) Int. Cl.
*H01M 10/04* (2006.01)
*H01M 2/12* (2006.01)
*H01M 2/34* (2006.01)
*H01M 2/04* (2006.01)

(56) References Cited

U.S. PATENT DOCUMENTS

2009/0297941 A1 12/2009 Shen et al.
2009/0311583 A1* 12/2009 Wu .................................. 429/82
2010/0330402 A1* 12/2010 Wang et al. ..................... 429/53
2011/0104531 A1* 5/2011 Lee ................................. 429/82

FOREIGN PATENT DOCUMENTS

| KR | 10-2004-0021799 A | 3/2004 |
| KR | 10-2005-0094664 A | 9/2005 |
| KR | 10-2007-0077436 A | 7/2007 |
| KR | 10-2008-0075229 A | 8/2008 |
| KR | 10-2010-0041472 A | 4/2010 |
| KR | 10-2012-0052035 A | 5/2012 |

* cited by examiner

CAP ASSEMBLY AND SECONDARY BATTERY USING THE SAME

CROSS-REFERENCE TO RELATED APPLICATION

The present application is a continuation of International Patent Application No. PCT/KR2011/009408 filed on Dec. 7, 2011, which claims priority to Korean Patent Application No. 10-2010-0124364 filed in the Republic of Korea on Dec. 7, 2010, the disclosures of which are incorporated herein by reference.

TECHNICAL FIELD

The present disclosure relates to a technique for manufacturing a secondary battery, and more particularly, to a cap assembly with an improved structure to ensure a stable coupling force and sealing force while allowing easy coupling between the cap assembly and a battery can, and a secondary battery using the same.

BACKGROUND ART

Generally, a secondary battery refers to a rechargeable battery, while a primary battery refers to a non-rechargeable battery. Secondary batteries are widely used for electronic devices such as cellular phones, notebook computers, video cameras, electric vehicles, or the like. In particular, a lithium secondary battery has an operating voltage of about 3.6 V, triple the capacity of nickel-cadmium batteries or nickel hydrogen batteries generally used as power sources of electronic devices, and due to its high energy density per unit weight, are being utilized more and more.

The lithium secondary battery generally uses lithium oxide and carbonaceous material as a cathode active material and an anode active material, respectively. The lithium secondary battery includes an electrode assembly in which a cathode plate and an anode plate respectively coated with the cathode active material and the anode active material are disposed with a separator interposed between them, and an exterior material which seals and receives the electrode assembly together with an electrolyte.

Meanwhile, depending on the shape of the battery case, a lithium secondary battery may be classified into a can type secondary battery where the electrode assembly is included in a metal can and a pouch type battery where the electrode assembly is included in a pouch of an aluminum laminate. In addition, depending on the shape of the metal can, the can type secondary battery may be further classified into a cylindrical battery and a rectangular battery. The exterior material of the rectangular or cylindrical secondary battery includes a battery can and a cap assembly sealably coupled to an open end of the battery can.

FIG. 1 is a sectional view showing a cap assembly 10 of a conventional cylindrical secondary battery.

Referring to FIG. 1, the cylindrical secondary battery generally includes a cylindrical battery can 20, a jelly-roll type electrode assembly 30 received in the battery can 20, a cap assembly 10 coupled to the upper portion of the battery can 20, a beading portion 40 provided at the front end of the battery can 20 for mounting the cap assembly 10, and a clamping portion 50 for sealing the battery.

The electrode assembly 30 is wound into a jelly-roll shape in a state where a separator is interposed between a cathode and an anode. A cathode lead 31 is attached to the cathode and connected to the cap assembly 10, and an anode lead (not shown) is attached to the anode and connected to the lower end of the battery can 20.

The cap assembly 10 includes a top cap 11 forming a cathode terminal, a safety element 12 for interrupting a current by increasing the resistance when the temperature in the battery increases, a safety vent 13 for interrupting a current and/or for exhausting gas when the pressure in the battery increases, an insulation member 14 for electrically separating a safety vent 13 except for a specific portion from a current interrupt member 15, and a current interrupt member 15 connected to a cathode lead 31 connected to the cathode, which are laminated in the above order. In addition, the cap assembly 10 is mounted to the beading portion 40 of the battery can 20 in a state of being mounted to a gasket. Therefore, in a normal operating condition, the cathode of the electrode assembly 30 is electrically connected to the top cap 11 via the cathode lead 31, the current interrupt member 15, the safety vent 13, and the safety element 12.

However, since the conventional secondary battery configured as above has the beading portion 40, the receiving space of the electrode assembly decreases as much as the area occupied by the beading portion 40, which may be an obstacle in increasing the capacity of the secondary battery.

Nevertheless, the beading portion 40 is provided at the secondary battery because if the beading portion 40 is not provided, the cap assembly 10 may not be easily placed on and coupled to the open end of the battery can 20. In addition, because it is difficult to ensure stable coupling force and sealing force of the cap assembly 10, problems such as power insensibility or electrolyte leakage may occur due to the separation of the cap assembly 10 or the cut of the electrode lead. Further, separation of the cap assembly 10 or electrolyte leakage may lead to secondary battery failure or damage or to even more serious problems such as fire or explosion.

DISCLOSURE

Technical Problem

The present disclosure is designed to solve the problems of the prior art, and therefore it is an object of the present disclosure to provide a cap assembly with an improved structure, which is capable of ensuring stable coupling force and sealing force while increasing a receiving space of an electrode assembly by being applied to a battery can free from a beading portion, and a secondary battery using the same.

Other objects and advantages of the present disclosure will be understood from the following description and become more apparent by embodiments of the present disclosure. In addition, it could be easily understood that the objects and advantages of the present disclosure can be implemented by means and their combinations defined in the claims.

Technical Solution

In a general aspect, the present disclosure provides a cap assembly for a secondary battery, coupled to an open end of a battery can free from a beading portion, which includes a top cap disposed on an uppermost portion in a protrusive form to form a cathode terminal; a safety element disposed below the top cap to contact the top cap; a safety vent disposed to contact the safety element; a gasket surrounding outer circumferences of the top cap, the safety element and the safety vent; a cover surrounding the gasket so that the top cap, the safety element and the safety vent closely adhere to each other; and a welding member disposed at an upper portion of the cover and having an outer end located to protrude more outwards than the outer end of the cover so as to be placed on the open end of the battery can, the welding member having a first notch formed at an upper surface thereof, which protrudes more than the outer end of the cover, and being welded to the open end of the battery can at a portion where the first notch is formed.

Preferably, the welding member is welded to the cover.

In another general aspect, the present disclosure provides a secondary battery, which includes an electrode assembly in which a cathode plate and an anode plate are disposed with a separator interposed between them; a battery can free from a beading portion and receiving the electrode assembly and an electrolyte; and a cap assembly including: a top cap disposed on an uppermost portion in a protrusive form to form a cathode terminal; a safety element disposed below the top cap to contact the top cap; a safety vent disposed to contact the safety element; a gasket surrounding outer circumferences of the top cap, the safety element and the safety vent; a cover surrounding the gasket so that the top cap, the safety element and the safety vent closely adhere to each other; and a welding member disposed at an upper portion of the cover and having an outer end located to protrude more outwards than the outer end of the cover so as to be placed on the open end of the battery can, the welding member having a first notch formed at an upper surface thereof, which protrudes more than the outer end of the cover, and being welded to the open end of the battery can at a portion where the first notch is formed.

Preferably, the welding member is welded to the cover.

Advantageous Effects

The cap assembly of the present disclosure may be applied to a secondary battery free from a bending portion to increase a receiving space of an electrode assembly in the battery can and thus increase the capacity of the secondary battery.

In addition, even though the battery can does not have a beading portion, the cap assembly may be easily mounted to an open end of the battery can, and when the cap assembly is welded to the battery can by laser, the welding process may be performed conveniently and uniformly.

Therefore, stable coupling force and sealing force are ensured between the cap assembly and the battery can, which prevents the cap assembly from being separated and prevents the electrolyte from leaking. For this reason, it is possible to prevent various problems such as failure or damage of the secondary battery and accidents such as fire or explosion from occurring due to the separation of the cap assembly or electrolyte leakage.

DESCRIPTION OF DRAWINGS

Other objects and aspects of the present disclosure will become apparent from the following descriptions of the embodiments with reference to the accompanying drawings in which.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
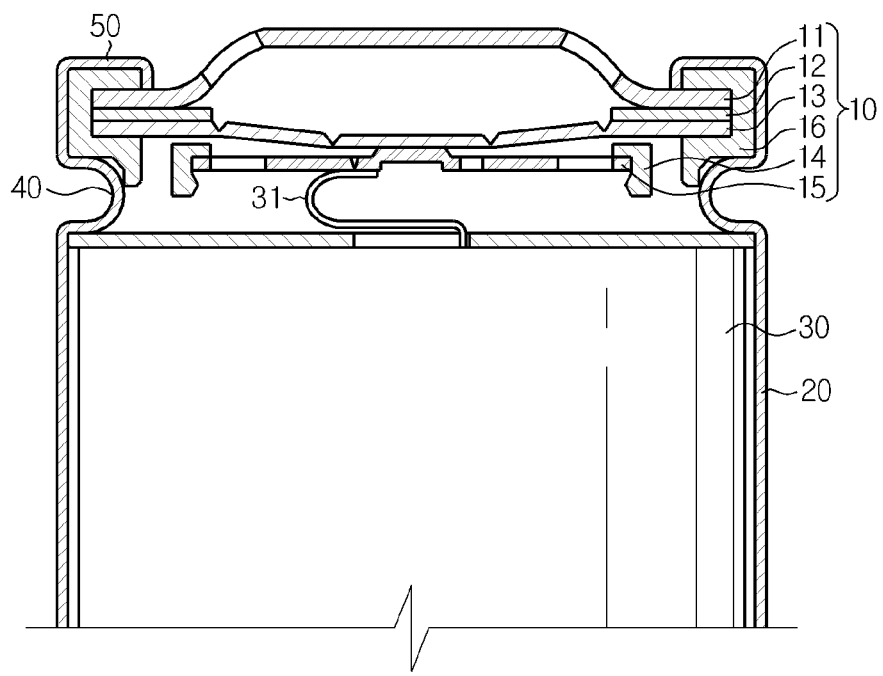
FIG. 1 is a cross-sectional view showing a cap assembly of a conventional cylindrical secondary battery.
Figure 2:
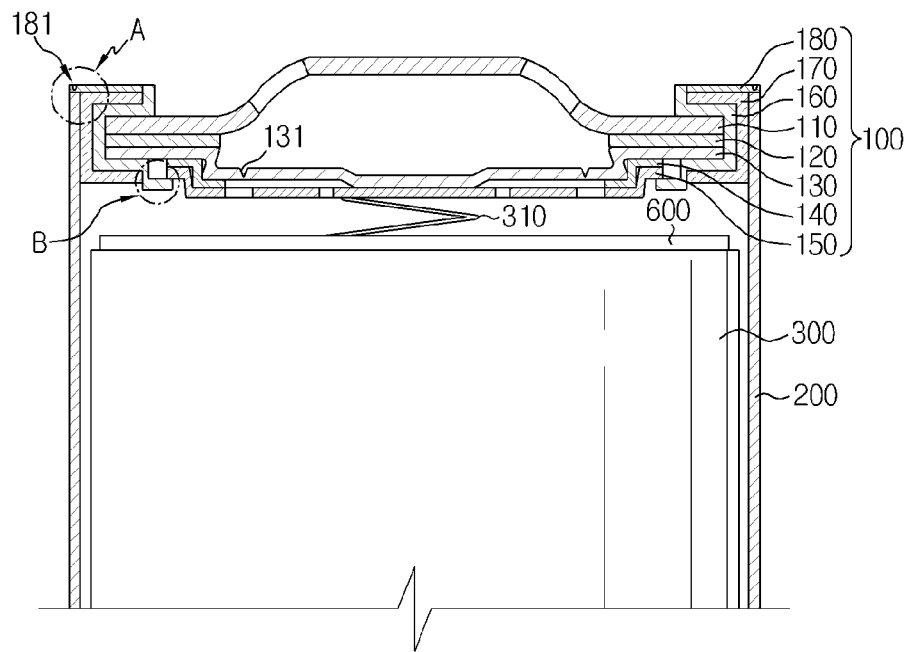
FIG. 2 is a cross-sectional view schematically showing a cap assembly of a secondary battery according to an embodiment of the present disclosure.

FIG. 2 is a cross-sectional view schematically showing a cap assembly 100 of a secondary battery according to an embodiment of the present disclosure.

Referring to FIG. 2, the secondary battery according to the present disclosure includes an electrode assembly 300, a battery can 200, and a cap assembly 100.

The electrode assembly 300 includes a cathode plate and an anode plate disposed with a separator interposed between them, and is received in a battery can 200. At this time, the electrode assembly 300 is also called a jelly roll since it is wound and disposed in a jelly-roll form. Electrode plates of the electrode assembly 300 are configured so that a current collector is coated with an active material slurry, and the slurry may be generally formed by stirring active material particles, auxiliary conductor, binder, plasticizer and so on, to which a solvent is added. Non-coating portions are preferably present at starting and ending portions of the current collector in a winding direction of the electrode plates, and an electrode lead 310 corresponding to each electrode plate may attach to the non-coating portion. Generally, the cathode lead is attached to the upper end of the electrode assembly 300 and is electrically connected to the cap assembly 100, and the anode lead is attached to the lower end of the electrode assembly 300 and is preferably connected to the bottom of the battery can 200.

Meanwhile, an upper insulation plate 600 may be disposed at the upper end of the electrode assembly 300. The upper insulation plate 600 plays a role of insulating the electrode assembly 300 from the cap assembly 100.

The battery can 200 is a light conductive metal material such as aluminum, stainless steel, or their alloys, and it may have a cylindrical or angled structure with an opening at an upper end and a closed bottom opposite to the opening. In the inner space of the battery can 200, the electrode assembly 300 is received together with an electrolyte.

The cap assembly 100 for a secondary battery according to the present disclosure includes a top cap 110, a safety element 120, a safety vent 130, a gasket 160, a cover 170 and a welding member 180. The cap assembly 100 may have a circular or angled shape according to the shape of the battery can 200.

The top cap 110 is disposed at the uppermost portion of the cap assembly 100 to protrude upwards, thereby forming a cathode terminal. Therefore, the top cap 110 allows electric connection to the outside. In addition, a gas hole for discharging gas may form in the top cap 110. Therefore, when gas is generated from the electrode assembly 300, the gas may discharge out of the battery can 200 through the gas hole. The top cap 110 may be made of, for example, metal material such as stainless steel and aluminum.

The safety element 120 is interposed between the top cap 110 and the safety vent 130 to electrically connect the top cap 110 to the safety vent 130. The safety element 120 is used for interrupting the current flow in the battery due to overheating of the battery, and it may be formed with, for example, a positive temperature coefficient (PTC) element.

The safety vent 130 is disposed below the safety element 120 to contact the safety element 120, and it is configured to fracture when the inner pressure of the secondary battery increases over a predetermined level. For example, the safety vent 130 may fracture when the inner pressure of the secondary battery is 12 to 25 kgf/cm². The safety vent 130 is formed so that its center portion protrudes downwards as shown in the figure, and a predetermined notch 131 may form near the center portion. Therefore, if gas is generated in the secondary battery, namely from the electrode assembly 300 to increase the inner pressure, the safety vent 130 inverts its shape to protrude upwards and is fractured around the notches 131. Therefore, the gas filled in the battery can 200 may discharge out through the fractured region of the safety vent 130.

The gasket 160 surrounds the top cap 110, the safety element 120, and the rim portion of the safety vent 130. Therefore, the gasket 160 may bend in a 'C' shape pattern as shown in the figure. The gasket 160 may be made of material with electric insulation, impact resistance, elasticity and endurance, for example polyolefin or polypropylene (PP). In addition, the gasket 160 may not be thermally treated but bent by mechanical processing in order to prevent the insulation from weakening.

The cover 170 surrounds the gasket 160 so that the top cap 110, the safety element 120 and the safety vent 130 are closely adhered, and may be bent into a 'C' shape to surround the outside of the gasket 160. The cover 170 may be made of nickel, aluminum, nickel alloy or aluminum alloy.

The welding member 180 is disposed at the upper portion of the cover 170, and the outer end of the welding member is placed on the open end of the battery can 200. For this, the outer end of the welding member 180 is located to protrude further to the outer end of the cover 170, as shown in the figure. In other words, the welding member 180 is formed to protrude in the outward direction of the secondary battery further to the outer circumference of the cover 170. In addition, a first notch 181 is formed at the upper surface of the welding member 180, which protrudes in the outward direction further to the outer end of the cover 170. This will be described in more detail below with reference to FIGS. 3 and 4.

Figure 3:
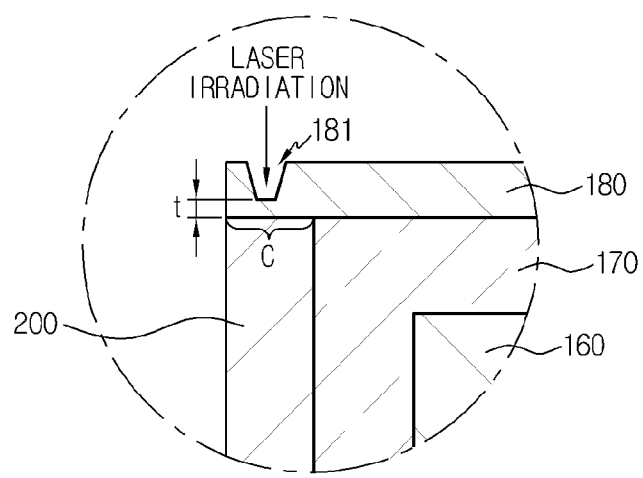
FIG. 3 is an enlarged view showing the portion A of FIG. 2.
Figure 4:
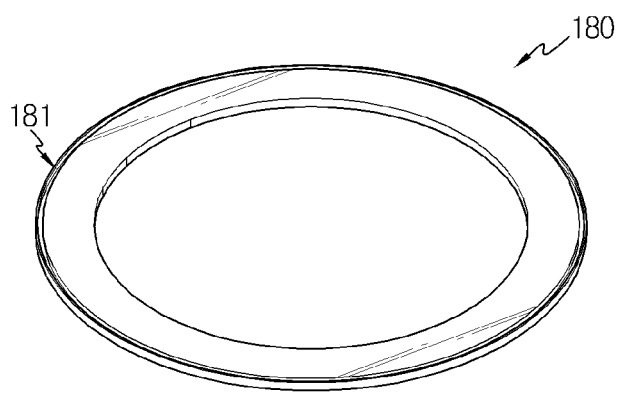
FIG. 4 is a schematic perspective view showing only a welding member of the cap assembly according to an embodiment of the present disclosure.

FIG. 3 is an enlarged view showing the portion A of FIG. 2, and FIG. 4 is a schematic perspective view showing only the welding member 180 of the cap assembly 100 according to an embodiment of the present disclosure.

Referring to FIGS. 3 and 4, the welding member 180 has a first notch 181 formed at a portion which is placed at the upper end of the battery can 200, namely the upper surface of the outer end which protrudes outwards more than the cover 170 as indicated by "C" in FIG. 3. Here, the notch represents a concave shape formed at the upper portion of the welding member 180, and it may also be expressed with similar terms such as a groove or depression. In addition, the shape and location of the first notch 181 depicted in the drawing are just an example, and the present disclosure is not limited to such a specific shape or location of the first notch 181.

Since the welding member 180 has the first notch 181 formed at the upper portion of a region which is placed at the upper end of the battery can 200, the welding member 180 may be welded to the open end of the battery can 200 at the portion where the first notch 181 is formed. In other words, according to the present disclosure, by irradiating laser to the region of the first notch 181 perpendicularly from a position above the welding member 180 as shown in FIG. 3, the portion C of the welding member 180 which extrudes out may be welded to the upper end of the battery can 200. In the case where laser is irradiated perpendicularly from a position above the welding member 180 to the welding member 180, the welding force between the welding member 180 and the battery can 200 may be enhanced. In addition, since laser may be irradiated along the first notch 181 formed at the upper portion of the welding member 180, the first notch 181 of the welding member 180 plays a role of guiding the laser welding, which ensures easier laser welding and uniform welding strength. Accordingly, the welding member 180 may be called a welding guide.

Preferably, the welding member 180 has a vertical length, namely thickness, of 0.3 mm or less at the portion where the first notch 181, as indicated by "t" in FIG. 3. If the welding member 180 is too thick at the welding portion, the welding member 180 and the battery can 200 may not be properly welded, or the weld strength may be weak. However, if the welding member 180 has a thickness of 0.3 mm or less at the welding portion as in the above embodiment, the welding member 180 and the battery can 200 may be well welded by laser while ensuring sufficient welding strength.

Meanwhile, in this embodiment, the welding member 180 may have a thickness no greater than a certain level at the portion where the first notch 181 is formed, but this does not mean that the entire thickness of the welding member 180 should be small where the first notch 181 is not formed. Therefore, besides the region where the first notch is formed, since the welding member 180 may have a thickness no smaller than a certain level, the welding member 180 may stably support and protect the cap assembly 100 with strength over a certain level. In addition, the thickness of the welding member 180 may not be entirely uniform except for the portion where the first notch 181 is formed, and the welding member 180 may have various thicknesses according to the shape of the cap assembly 100 or the battery can 200.

The welding member 180 may be made of material such as nickel-plated steel (Ni-plated steel), stainless steel (SUS) or SPCE and may also be made of the same material as the cover 170. Particularly, the welding member 180 is preferably made of material containing nickel in order to prevent corrosion. However, the present disclosure is not limited to such specific material of the welding member 180.

Meanwhile, the configurations of the welding member 180 and the cap assembly 100 as shown in FIGS. 2 to 4 are just examples, and various modifications can be made as apparent to those having ordinary skill in the art.

Figure 5:
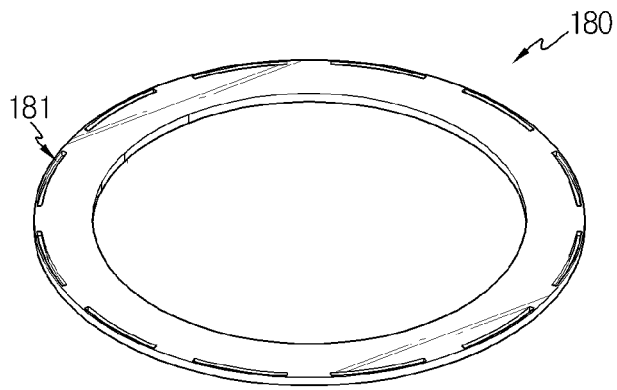
FIG. 5 is a schematic perspective view showing only a welding member according to another embodiment of the present disclosure.

FIG. 5 is a schematic perspective view showing a welding member 180 according to another embodiment of the present disclosure.

Referring to FIG. 5, the welding member 180 of the cap assembly 100 according to the present disclosure has a first notch 181 formed at the upper surface of a portion placed on the battery can 200 and not formed on the entire upper surface of the outer end as shown in FIG. 4, but partially thereon. In this case, the time and cost required for welding may be reduced.

In addition, even though this embodiment has been illustrated so that a single first notch 181 is formed at the upper surface of the welding member 180, a plurality of first notches 181 may be formed, namely as multi layers.

Figure 6:
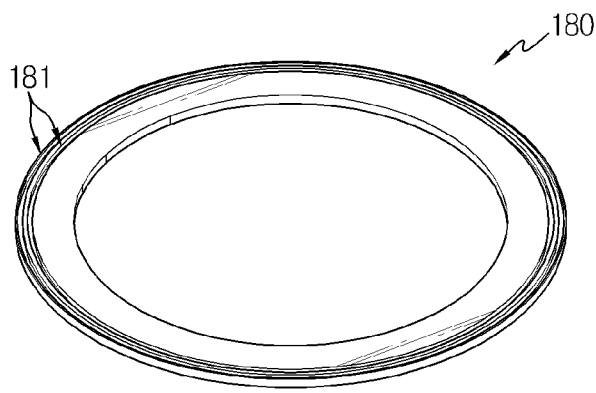
FIG. 6 is a schematic perspective view showing only a welding member according to still another embodiment of the present disclosure.
Figure 7:
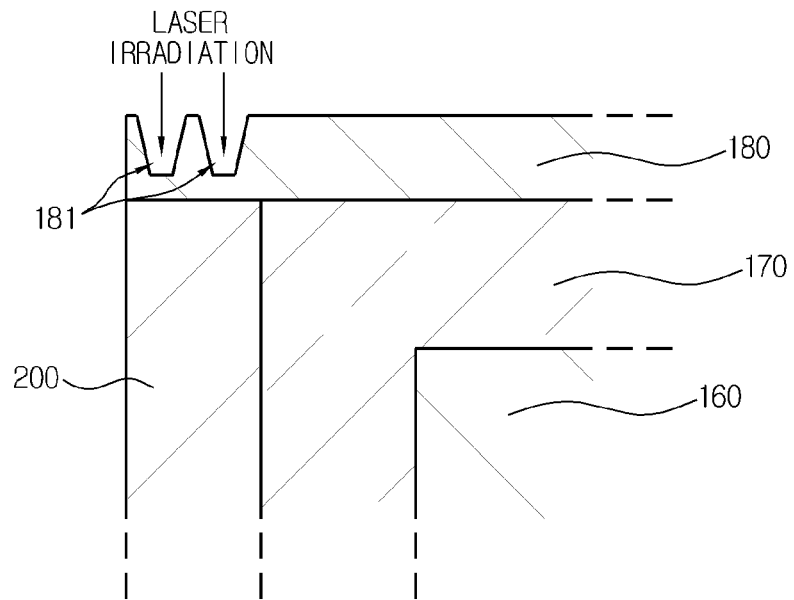
FIG. 7 is a partially-sectioned view schematically showing the cap assembly having the welding member of FIG. 6, which is welded to the upper end of a battery can.

FIG. 6 is a schematic perspective view showing only a welding member 180 according to still another embodiment of the present disclosure, and FIG. 7 is a partially-sectioned view schematically showing the cap assembly 200 having the welding member 180 of FIG. 6, which is welded to the upper end of the battery can 200.

Referring to FIGS. 6 and 7, the welding member 180 of the cap assembly 100 according to the present disclosure may have two first notches 181 formed at the upper surface of the outer end. In this case, when the welding member 180 is welded to the battery can 200, laser may be irradiated to both the double-layered first notches 181 for welding. If at least two notches are formed at the upper surface of a portion placed on the battery can 200 of the welding member 180, the welding strength by laser welding may be further enhanced. In addition, different from FIGS. 6 and 7, three or more notches may also be formed at the upper surface of a portion placed on the battery can 200 of the welding member 180.

Figure 8:
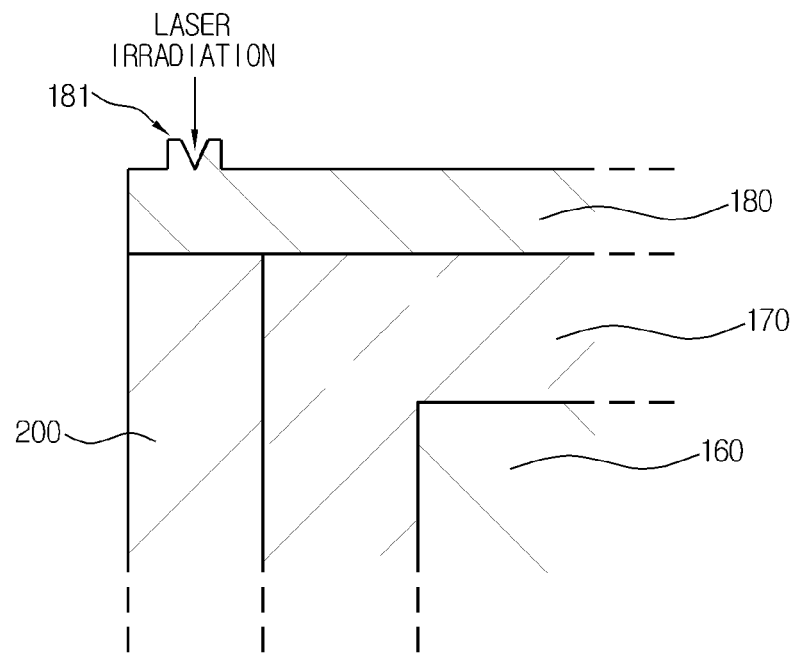
FIG. 8 is a partially-sectioned view showing a cap assembly where a first notch with a different shape is formed.

FIG. 8 is a partially-sectioned view showing the cap assembly 100 having a first notch 181 of a different shape.

As shown in FIG. 8, the first notch 181 of the welding member 180 may be formed with a concave or convex shape, without being limited thereto.

Since the cap assembly 100 according to the present disclosure has the welding member 180 at the upper portion thereof and the welding member 180 is welded by laser to the battery can 200 at a portion where the first notch 181 is formed as described above, the cap assembly 100 is strongly coupled to the battery can 200 and electrolyte leakage is also prevented.

Preferably, the welding member 180 of the cap assembly 100 is welded to the cover 170. If the welding member 180 is welded to the cover 170 as described above, the fixing force between the welding member 180 and the cover 170 is enhanced, which may eventually ensure stable coupling force between the cap assembly 100 and the battery can 200. In other words, according to this embodiment, the cover 170 surrounding the outer circumferences of the top cap 110, the safety element 120, the safety vent 130 and the gasket 160 is welded to the welding member 180, and the welding member 180 is welded to the battery can 200, so that the battery can 200 may be stably coupled to the cap assembly 100. Therefore, it is possible to prevent the cap assembly 100 from being separated and prevent the electrode lead 310 from being cut. In addition, if the welding member 180 is welded to the cover 170 as described above, the electrolyte leakage between the welding member 180 and the cover 170 may be prevented, which improves the sealing force of the cap assembly 100.

Here, the welding member 180 has a second notch formed at its upper surface for welding to the cover 170, so that the welding member 180 may be welded to the cover 170 at a portion where the second notch is formed.

Figure 9:
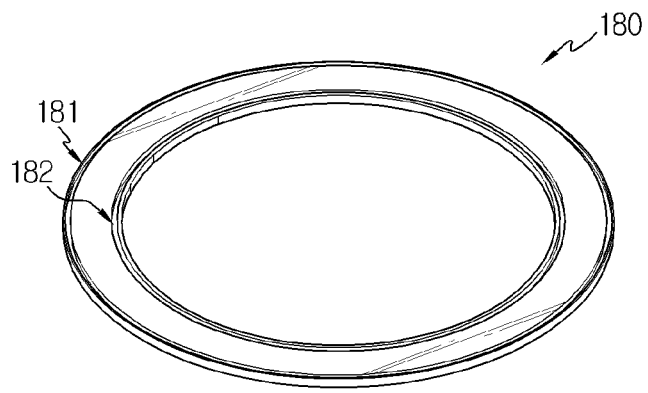
FIG. 9 is a schematic perspective view showing only a welding member according to further another embodiment of the present disclosure.
Figure 10:
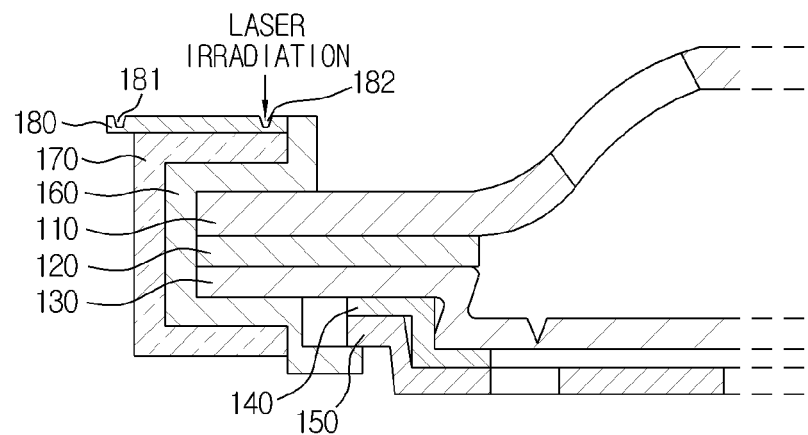
FIG. 10 is a schematic perspective view showing only a cap assembly having the welding member of FIG. 9.

FIG. 9 is a schematic perspective view showing only a welding member 180 according to another further embodiment of the present disclosure, and FIG. 10 is a schematic perspective view showing only a cap assembly 100 having the welding member 180 of FIG. 9.

Referring to FIGS. 9 and 10, the welding member 180 has a second notch 182 formed at the upper surface thereof. At this time, the second notch 182 may be formed at any location of the upper surface of the welding member 180, besides portion C protruding more outwards than the cover 170. In other words, the second notch 182 may be formed at any location of the welding member 180 if the location contacts the cover 170 at the lower surface thereof. In addition, the sizes, shapes, locations or the like of the second notch 182 as shown in FIGS. 9 and 10 are just examples, and in the present disclosure, the second notch 182 may have various sizes, shapes, locations or the like, similar to the first notch 181. In addition, as shown in FIG. 10, laser is irradiated to the second notch 182 formed at the upper surface of the welding member 180, so that welding is performed at a portion where the lower surface of the welding member 180 contacts the upper surface of the cover 170.

In a case where laser is perpendicularly irradiated from a position above the welding member 180 toward the second notch 182 of the welding member 180, the welding strength between the welding member 180 and the cover 170 may be enhanced. In addition, the second notch 182 of the welding member 180 may play a role of guiding the laser welding, which may facilitate the welding process between the welding member 180 and the cover 170.

Meanwhile, the vertical length of the portion where the second notch 182 is formed is preferably 0.3 mm or less, similar to the portion where the first notch 181 is formed. In addition, a plurality of second notches 182 may also be formed at the upper portion of the welding member 180, similar to the first notch 181.

In addition, in the cap assembly 100 according to the present disclosure, the inner end of the welding member 180 may be located more outwards than the inner end of the cover 170 in order to be welded to the cover 170.

Figure 11:
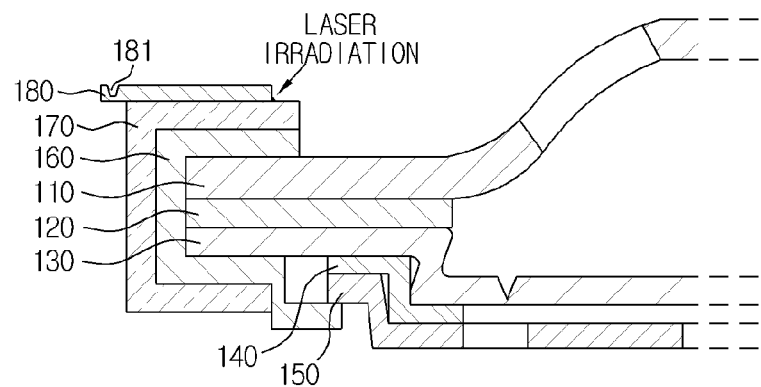
FIG. 11 is a cross-sectional view schematically showing a cap assembly according to another embodiment of the present disclosure.

FIG. 11 is a cross-sectional view schematically showing a cap assembly 100 according to another embodiment of the present disclosure.

Referring to FIG. 11, in the cap assembly 100, the inner end of the welding member 180 is located more outwards than the inner end of the cover 170, and the cover 170 is exposed inwards from the inner end of the welding member 180. In other words, in this embodiment, the cap assembly 100 is configured so that the welding member 180 does not cover the entire upper portion of the cover 170 but partially exposes the cover 170. In addition, as shown in FIG. 11, laser may be irradiated to a border portion where the inner end of the welding member 180 contacts the upper surface of the cover 170, thereby welding the welding member 180 to the cover 170. According to this embodiment, even though the second notch 182 is not formed at the upper surface of the welding member 180 as shown in FIGS. 9 and 10, the welding member 180 may be welded to the cover 170 by irradiating laser from a position above the welding member 180 to the welding member 180.

Meanwhile, even though the embodiment shown in FIGS. 9 to 11 has been illustrated based on a configuration where the welding member 180 is welded to the cover 170 it is just an example and the welding member 180 may be welded to the cover 170 in various ways. In addition, the present disclosure is not limited to a specific welding configuration of the welding member 180 and the cap assembly 100.

As described above, the welding process of the welding member 180 and the cover 170 is preferably performed before the battery can 200 and the welding member 180 are welded in the cap assembly 100 mounted to the open end of the battery can 200. However, the present disclosure is not limited thereto.

In addition, the welding member 180 and the cover 170 may also not be welded to each other. At this time, a configuration for placing the cap assembly 100 on the open end of the battery can 200 is preferably provided.

Figure 12:
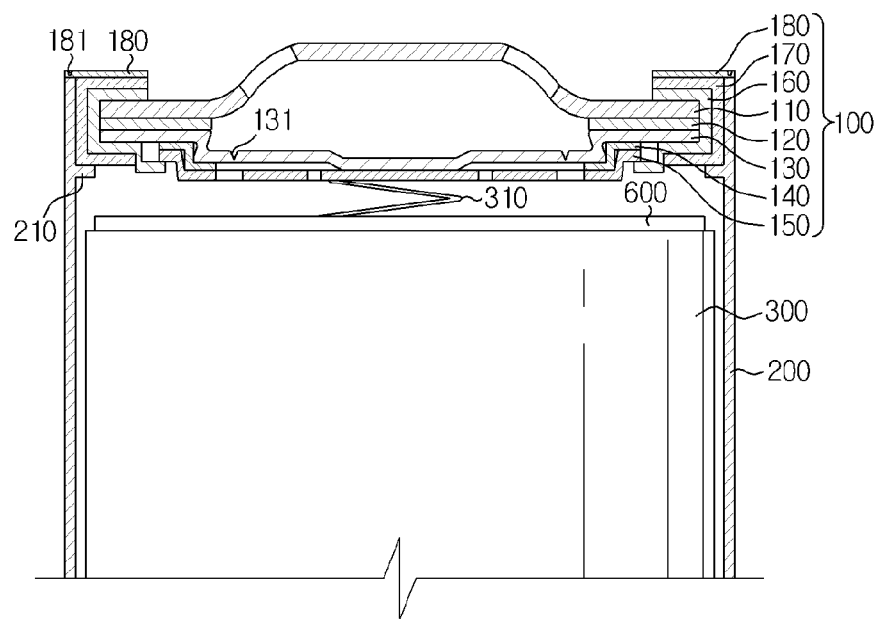
FIG. 12 is a cross-sectional view schematically showing the cap assembly according to an embodiment of the present invention, which is welded to the open end of a battery can.

FIG. 12 is a cross-sectional view schematically showing the cap assembly 100 according to an embodiment of the present invention, which is welded to the open end of a battery can 200.

Referring to FIG. 12, a placing portion 210 is provided at the open end of the battery can 200 according to the present disclosure. In addition, as the lower end of the cover 170 is placed on the placing portion 210, the cover 170 as well as various components of the cap assembly 100 surrounded by the cover 170, for example the top cap 110, the safety element 120, the safety vent 130 and the gasket 160, may be supported upwards at the open end of the battery can 200. In addition, according to the present disclosure, since the welding member 180 welded to the battery can 200 is provided at the upper portion of the cover 170 to support the cover 170 as well as other components of the cap assembly 100 downwards, the cap assembly 100 may be stably coupled and fixed to the open end of the battery can 200. Here, the placing portion 210 provided at the open end of the battery can 200 may be configured as a protrusion as shown in FIG. 12 or as a stepped shape. The present disclosure is not limited to a specific shape or size of the placing portion 210 where the cover 170 is placed.

In addition, as shown in FIG. 2, the cap assembly 100 according to the present disclosure may further include a current interrupt member 150 and an insulation member 140.

The current interrupt member 150 is a component of the cap assembly 100 and its upper portion is at least partially connected to the lower end of the safety vent 130. Therefore, in a normal state, the downward protrusion of the safety vent 130 contacts the current interrupt member 150 to make an electric connection. However, if the inner pressure increases due to gas generation to turn the shape of the safety vent 130, the electric connection between the current interrupt member 150 and the safety vent 130 may be interrupted. In addition, the lower portion of the current interrupt member 150 may be connected to the electrode assembly 300, more particularly to the electrode lead 310 attached to the electrode assembly 300. Therefore, in a normal state, the current interrupt member 150 makes an electric connection between the electrode assembly 300 and the safety vent 130. A notch may be formed at a predetermined location of the current interrupt member 150, and the current interrupt member 150 may be deformed together with the safety vent 130 due to the inner pressure of the secondary battery.

The insulation member 140 is interposed between the safety vent 130 and the current interrupt member 150 so that the current interrupt member 150 and the safety vent 130 are electrically insulated except for the protruded portion of the safety vent 130 and the portion where the current interrupt member 150 contacts.

At this time, a lower end of the gasket 160 of the cap assembly 100 preferably extends to surround the lower portion of the current interrupt member 150. In other words, as shown in portion B of FIG. 2, the lower end of the gasket 160 preferably extends to a location below the current interrupt member 150 to surround the lower portion of the current interrupt member 150. In this case, the gasket 160 may support and protect the current interrupt member 150. Further, due to this configuration of the gasket 160, in a case where an impact is applied to a side of the battery can 200 so that the battery can 200 is deformed inwards, the lower end of the gasket 160 moves inwards further from a position below the current interrupt member 150, and so the gasket 160 may more securely surround, support and protect the lower portion of the current interrupt member 150.

In addition, a space is preferably formed in the horizontal direction between the gasket 160 and the current interrupt member 150. In this case, even though an external impact is applied, the impact transferred to the gasket 160 is not instantly transferred to the current interrupt member 150, and so it is possible to absorb and relieve the impact transferred to the current interrupt member 150.

The present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

What is claimed is:

1. A cap assembly for a secondary battery, coupled to an open end of a battery can free from a beading portion, the cap assembly comprising:
    a top cap disposed on an uppermost portion in a protrusive form to form a cathode terminal;
    a safety element disposed below the top cap to contact the top cap;
    a safety vent disposed to contact the safety element;
    a gasket surrounding outer circumferences of the top cap, the safety element and the safety vent;
    a cover surrounding the gasket so that the top cap, the safety element and the safety vent closely adhere to each other; and
    a welding member disposed at an upper portion of the cover and having an outer end located to protrude more outwards than the outer end of the cover so as to be placed on the open end of the battery can, the welding member having a first notch formed at an upper surface thereof, which protrudes more than the outer end of the cover, and being welded to the open end of the battery can at a portion where the first notch is formed.

2. The cap assembly for a secondary battery according to claim 1, wherein the welding member is welded to the cover.

3. The cap assembly for a secondary battery according to claim 2, wherein an inner end of the welding member is located more outwards than the inner end of the cover and the welding member is welded to the cover at a portion where the inner end of the welding member is formed.

4. The cap assembly for a secondary battery according to claim 2, wherein the welding member has a second notch formed at the upper surface thereof and is welded to the cover at a portion where the second notch is formed.

5. The cap assembly for a secondary battery according to claim 1, wherein the battery can has a placing portion at the open end, and wherein the cover is placed on the placing portion of the battery can.

6. The cap assembly for a secondary battery according to claim 1, wherein the welding member has a vertical length of 0.3 mm or less at the portion where the first notch is formed.

7. The cap assembly for a secondary battery according to claim 1, further comprising:

a current interrupt member having an upper portion which is connected to the lower end of the safety vent and a lower portion which is connectable to an electrode assembly; and an insulation member interposed between the safety vent and the current interrupt member to partially electrically insulate the current interrupt member from the safety vent.

8. The cap assembly for a secondary battery according to claim 7, wherein a lower end of the gasket extends to surround a lower portion of the current interrupt member.

9. The cap assembly for a secondary battery according to claim 1, wherein the cap assembly has a circular shape.

10. A secondary battery, comprising:

an electrode assembly in which a cathode plate and an anode plate are disposed with a separator interposed between them;

a battery can free from a beading portion and receiving the electrode assembly and an electrolyte; and a cap assembly including:

a top cap disposed on an uppermost portion in a protrusive form to form a cathode terminal;

a safety element disposed below the top cap to contact the top cap;

a safety vent disposed to contact the safety element;

a gasket surrounding outer circumferences of the top cap, the safety element and the safety vent;

a cover surrounding the gasket so that the top cap, the safety element and the safety vent closely adhere to each other; and a welding member disposed at an upper portion of the cover and having an outer end located to protrude more outwards than the outer end of the cover so as to be placed on the open end of the battery can, the welding member having a first notch formed at an upper surface thereof, which protrudes more than the outer end of the cover, and being welded to the open end of the battery can at a portion where the first notch is formed.

11. The secondary battery according to claim 10, wherein the welding member is welded to the cover.

12. The secondary battery according to claim 11, wherein an inner end of the welding member is located more outwards than the inner end of the cover and the welding member is welded to the cover at a portion where the inner end of the welding member is formed.

13. The secondary battery according to claim 11, wherein the welding member has a second notch formed at the upper surface thereof and is welded to the cover at a portion where the second notch is formed.

14. The secondary battery according to claim 10, wherein the battery can has a placing portion at the open end, and wherein the cover is placed on the placing portion of the battery can.

15. The secondary battery according to claim 10, wherein the welding member has a vertical length of 0.3 mm or less at the portion where the first notch is formed.

16. The secondary battery according to claim 10, wherein the cap assembly further includes:

a current interrupt member having an upper portion which is connected to the lower end of the safety vent and a lower portion which is connectable to an electrode assembly; and an insulation member interposed between the safety vent and the current interrupt member to partially electrically insulate the current interrupt member from the safety vent.

17. The secondary battery according to claim 16, wherein the gasket extends so that a lower end of the gasket surrounds a lower portion of the current interrupt member.

18. The secondary battery according to claim 10, wherein the battery can has a circular shape.

* * * * *